US006148310A

United States Patent [19]
Azagury et al.

[11] Patent Number: 6,148,310
[45] Date of Patent: Nov. 14, 2000

[54] METHOD FOR COMBINING CARD MARKING WITH REMEMBERED SETS FOR OLD AREA OF A MEMORY HEAP

[75] Inventors: Alain Azagury, Nesher; Elliot K. Kolodner, Haifa; Erez Petrank, Haifa; Zvi Yehudai, Haifa, all of Israel

[73] Assignee: International Business Machines Corporation, Armonk, N.Y.

[21] Appl. No.: 09/139,754

[22] Filed: Aug. 25, 1998

[51] Int. Cl.[7] ................................................. G06F 17/30
[52] U.S. Cl. ............................................................ 707/206
[58] Field of Search ..................... 707/206; 711/170–173

[56] References Cited

U.S. PATENT DOCUMENTS

| 5,903,900 | 5/1999 | Kuippel et al. ........................ 707/206 |
| 6,038,572 | 3/2000 | Schwartz et al. ...................... 707/206 |

OTHER PUBLICATIONS

Hudson et al., "A Language–Independent Garbage Collector Toolkit," COINS Technical Report 91–47, Sep. 1991.

Holzle, U., "A Fast Write Barrier for Generational $Gar_{bag}e$ Collectors," OOPSLA/ECOOP '93, Workshop on Garbage Collections in Object–Oriented Systems, Oct. 1993.

Hosking, A.L., et al., "Remembered Sets Can Also Play Cards," OOPSLA '93, Workshop on Garbage Collection and Memory Management, Washington D.C., Sep. 1993.

Hudson, R.L., et al., "Incremental Collection of Mature Objects," Proceedings on International Workshop on Memory Management, vol. 637 of Lecture Notes in Computer Science, Springer–Verlag, 1992.

Lieberman, H., et al., "A Real–Time Garbage Collector Based on the Lifetimes of Objects," Communications of the ACM, 26–6:419–429 (1983).

Seligmann, J., et al., "Incremental Mature Garbage Collection Using the Train Algorithm," Proceedings of 1995 European Conference on Object–Oriented Programming, Lecture Notes in Computer–Science, Springer–Verlag Aug. 1995.

Sobalvarro, P.G., "A Lifetime–based Garbage Collector for LISP Systems on General–Purpose Computers," Technical Report AITR–1417, MIT, AI Lab, Feb. 1988.

Ungar, D., "Generation Scavenging: A Non–disruptive High Performance Storage Reclamation Algorithm," Proceedings of the ACM Symposium on Practical Software Development Environments, ACM SIGPLAN Notices 19–5: 157–167 (1984).

Wilson, P.R., "Uniprocessor Garbage Collection Techniques," Proceedings of International Workshop on Memory Management, vol. 637 of Lecture Notes in Computer Science, Springer–Verlag, 1992.

Wilson, P.R., "A 'Card–Marking' Scheme for Controlling Intergenerational References in Generation–Based Garbage Collection on Stock Hardware," ACM SIGPLAN Notices, 24–5:87–92 (1989).

R.E. Jones and R.D. Lins. Garbage Collection: Algorithms for Automatic Dynamic Memory Management. Chapter 7 John Wiley & Sons (1996).

Primary Examiner—Paul V. Kulik
Attorney, Agent, or Firm—Browdy and Neimark

[57] ABSTRACT

A system for garbage collection of memory objects in a memory heap. The system includes memory heap that is partitioned into respective old and young areas. The old area is partitioned into cars and is further associated with card markings and remembered sets data structures. The card markings include for each card, a card time stamp that represents the time that the card was updated. The car includes, for each car, a car time entry stamp that represents the time the remembered set of the car was updated. The system further includes a processor communicating with the memory, and being capable of identifying all cards that were updated later than the remembered set of a selected car. In response to the event, it performs identifying change in pointers that refer from the card to a memory object in the selected car and in response to identified change in pointers, updating the remembered set of the car with the identified pointers. The process is further capable of updating the car time stamp of the selected car.

19 Claims, 5 Drawing Sheets

| 43 | | 44 |
|---|---|---|
| CAR No. | ○ ○ ○ ○ | CAR TIME STAMP |
| | | |

FIG.3B

| 45 | | 46 |
|---|---|---|
| CARD No. | ○ ○ ○ ○ | CARD TIME STAMP |
| | | |

FIG.3C

METHOD FOR COMBINING CARD MARKING WITH REMEMBERED SETS FOR OLD AREA OF A MEMORY HEAP

FIELD OF THE INVENTION

The present invention is in the general field of memory management and concerns more specifically garbage collected (GC) computer language and systems.

I. LIST OF PRIOR ART

In the description below, reference is occasionally made to the following publications:

[1] R. E. Jones and R. D. Lins. Garbage Collection: Algorithms for Automatic Dynamic Memory Management. John Wiley & Sons, July 1996.

[2] U. Hölzle. A fast write barrier for generational garbage collectors. In Eliot Moss, Paul R. Wilson, and Benjamin Zorn, editors. *OOPSLA/ECOOP '93 Workshop on Garbage Collections in Object-Oriented Systems*, October 1993

[3] A. L. Hosking and R. L. Hudson. Remembered Sets Can Also Play Cards. In *OOPSLA '93 Workshop on Garbage Collection and Memory Management*, Washington, DC, September 1993.

[4] R. L. Hudson and J. E. B. Moss. Incremental garbage collection for mature objects. In Yves Beakers and Jacques Cohen, editors. Proceedings of International Workshop on Memory Management, volume 637 of Lecture Notes in Computer Science, 1992. Springer-Verlag.

[5] H. Lieberman and C. E. Hewitt. *A Real Time Garbage Collector Based on the Lifetimes of Objects. Communications of the ACM*, 26(6), pages 419–429, 1983.

[6] J. Seligmann and S. Grarup. Incremental mature garbage collection using the train algorithm. in O. Nierstras, editor. Proceedings of 1995 *European Conference on Object-Oriented Programming*, Lecture Notes in Computer Science. Springer-Verlag, August 1995.

[7] Patrick Sobalvarro. A lifetime-based garbage collector for Lisp systems on general-purpose computers. Technical Report AITR-1417, MIT, AI Lab, February 1988.

[8] D. Ungar. Generation Scavenging: A. Non-disruptive High Performance Storage Reclamation Algorithm. Proceedings of the *ACM Symposium on Practical Software Development Environments*, ACM SIGPLAN Notices Vol. 19, No. 5, May 1984, pp. 157–167.

[9] Paul R Wilson. Uniprocessor garbage collection techniques. In Yves Bekkers and Jacques Cohen, editors. *Proceedings of International Workshop on Memory Management*, volume 637 of Lecture Notes in Computer Science, 1992. Springer-Verlag.

[10] P. R Wilson and T. G. Moher. A card-making scheme for controlling intergenerational references in generation-based garbage collection on stock hardware. *ACM SIGPLAN Notices*, 24(5):87–92, 1989.

BACKGROUND OF THE INVENTION

In the context of memory management, garbage collection is an important task which identifies and collects memory objects that were previously allocated for a given computer application, and are no longer used thereby. Consider, for example, a continuous (and relatively large) heap (10) (see FIG. 1) and a smaller, so called "root memory module" (12), representative of memory currently in use by one or more computer applications.

All those objects (14) that are directly or indirectly reachable from the root by pointers are "alive" and should not be collected. In contrast thereto, all the objects (16) which have no reference pointers are effectively no longer in use and are therefore regarded as garbage that should be collected. After collection, only active objects are maintained in the heap and memory space that has just been released due to garbage collection, may be allocated for new applications.

The standard approach of scanning the entire heap in order to identify and collect garbage objects is time consuming and therefore an improved scheme called 'generational collection' [5] has been developed, and is now a well accepted solution for reducing price times induced by garbage collection. Generational garbage collectors rely on the assumption that many objects die young. Under this assumption, it is useful to collect the garbage in the young area more frequently. Young objects that survive several collections are "promoted" to the older generation. Since the young generation is kept small, most collections are fast and do not stall the application for too long.

An improved solution for reducing delay tine imposed by the garbage collection procedure, for "young" generations is disclosed in a co-pending U.S. patent application Ser. No. 09/139,752 assigned to the present Applicant and filed simultaneously to the present application, and entitled "A Method for Combining Card Marking With a Remembered bet for Generational Garbage Collection With More Then Two Generations". The contents of U.S. patent application Ser. No. 09/139,752 are incorporated herein by reference.

Considering that "older" generations occupy, as a rule, larger part of the heap (as compared to the younger one) the garbage collection procedure is by default longer, and conventional garbage collection application that are applicable to the relatively small young generation area are as a rule inefficient, in terms of processing overhead, for the relatively large old area of the heap.

In the context of the present invention, reference is made to a so-called "train" algorithm which is known per se (see discussion below) and to two data structures, i.e. remembered sets and card markings. Whilst in the present invention card marking and remembered sets data structures are utilized by the train algorithm (for "old" generation GC), there follows a brief description of the specified data structures in connection with a more simple application, i.e. tracking inter-generational pointers in a young generation GC.

Thus, FIG. 2 illustrates schematically a generational garbage collection scheme, wherein the heap (20) is partitioned into two areas: young and old, (21) and (22), respectively. The young area (21) is scanned more frequently and after garbage objects therein are collected and some of the surviving objects are moved to the old area, objects may be allocated in the young area for new applications. The advantages of the generational garbage collection approach are:

1. Most collections are fast and efficient: they concentrate on the young area where it is expected to find a high percentage of garbage.
2. The heap is frequently collected. Thus the heap is frequently reused.
3. The collector uses a smaller working set since most collections only scan a small part of the heap.
4. The specified advantages (2 and 3) give rise to overall better system behavior with less paging: i.e. the collector traces through fewer pages and the program maintains a small working set since the heap is reused.

Since, only part of the heap is scanned, it is required to identify not only those pointers that reference objects from the root to the young area (e.g. pointer (25), but also inter-generational pointers (e.g. (26), i.e. pointers that originate from objects residing in the old generation and reference objects in the young generation. As will be explained in greater detail below, data structures are known in the literature which assist in rapidly identifying the inter-generational pointers for GC purposes.

In a generational scheme, typically, when a generation is subject to GC, all the younger generations are also collected. This reduces the bookkeeping for inter-generational pointers, so that only pointers from older to younger generations need to be maintained. Typically, the number of such pointers is relatively small and, thus, generational collections can use a data structure to maintain an (almost) updated list of these inter-generational pointers. Two possible data structures are suggested in the prior art [5], [7] and [8]: card marking and remembered sets. A combination of the two is suggested in [3].

One way to record inter-generational pointers for a given generation is to maintain a remembered set for the generation [5] and [8]. In the remembered set of generation g, all locations of the inter-generational pointers that reference objects in generation g are kept. Maintenance of this set is done by the application whenever a pointer is modified, and by the collector when objects are promoted. Variations on this method are discussed in [1] and [9].

Maintaining the remembered set imposes a costly overhead on the application during normal operation seeing that any change of a pointer necessitates insertion and/or deletion of a member in the remembered set. Card marking reduces this cost [7]. Here, the heap is partitioned into cards of equal size, and whenever the application modifies an object in a card, it marks the card as dirty. Marking a card is a very short operation for the user program [2], [7], [10]. Depending on the specific processor, it may be implemented in 3 to 6 instructions. However, the collector performs more work in a card marking system. It must scan all the dirty cards to find the inter-generational pointers, instead of just getting the pointer from the remembered set. Dirty cards are cards that were recently modified by the application some of which contain inter-generational pointers, the latter being scanned repeatedly.

The advantage of combining these two methods is pointed out by Hosking and Moss [3]. After scanning a card once to find all modifications, the relevant inter-generational pointers can be kept in a remembered set and the card need not be scanned again unless it is modified. This keeps the advantage of low overhead on the application, but also increases the collector efficiency, since cards are scanned once and rot repeatedly; their dirty flag is cleared; and only dirty (modified) cards are scanned.

The utilization of conventional remembered sets and card marking data structures poses a significant overhead in a generational scheme. Thus, suppose that a few young generations are collected, all dirty cards are scanned, and the remembered set of each collected generation is updated. The dilemma is whether all the remembered sets, including remembered sets of generations that were not collected should be updated. If in the affirmative, longer delays are caused, while collecting the younger generations. (Recall that updating the remembered sets means removing all entrees that have become relevant plus adding entries for new inter-generational pointers). On the other hand, if not all the remembered sets are updated, then the mark of the card cannot be cleared, since it has not been scanned for older generations. The inevitable consequence of failing to clear the marks is that the card is unnecessarily scanned again and again during future collections of the young generations.

Having described, in general, the remembered sets and card markings data structures (although in connection with young generation GC), there follows now a brief description of the so called train algorithm for old generation GC.

Hudson and Moss [4] suggest use of the train algorithm to cope with the problem of scanning the relatively large old area of the heap which, if otherwise implemented in a standard (long) sequential scanning of the heap, could lead to undue stalls and delays of the user program. The train algorithm partitions the old generation into parts called cars, and collects one car at time.

The problem with a naive implementation of this idea is that cycles of garbage that spread among several cars cannot be collected. Thus, the cars are grouped into trains, and the algorithm aims at relocating clusters of garbage into a single train and at the same time, relocating living objects (that are not part of the cluster) out of the train. Motivations, details and an implementation of the train algorithm are to be found in the prior art [4] and [6]. Only those details of the algorithm that are relevant for the present application are now discussed.

First, when a car is collected, the young generation is collected as well. Actually, the young generation may sometimes be collected without any car collection. Second, trains are numbered, cars and numbered, and the lowest car in the lowest train is chosen for collection. During this collection, objects are moved out of the car into other trains or the same train. Sometimes the objects are moved into existing cars and sometimes new cars are created to store them. These new cars may reside in an existing train or a new train may be created for them. After all live objects are moved from the car being collected, the car is reclaimed for future allocations. The remaining objects that are promoted from the young generation may also go into either old or new cars in various trains.

Each car has a remembered set so that when a car is collected, incoming pointers may be located efficiently. This remembered set is used to keep track of pointers that go from other cars into this car. It is not necessary to keep track of pointers that reference this car from the young generation, since the young generation is fully scanned during each collection, and thus all pointers from the young generation into the collected car will be discovered during this scan.

In order to keep the overhead during normal operation low, it has been proposed to combine card marking with the remembered set method as suggested in [3], [4]. The old heap is partitioned into cards and when the application modifies a card, it marks the card "dirty". When a car has to be scanned, all dirty cards are scanned and the remembered set is updated and later used to find roots for the collection.

Similar to the young GC application described above, the same dilemma of updating the remembered sets arises. Thus, there are only few remembered sets that are relevant to the current collection, and it is desired to avoid updating all the remembered sets considering that there are, as a rule, many of them (as many as the number of cars that are spread over the old generation). It is therefore desired to keep track of which cards should be scanned for which car collection. Otherwise, the cards are rescanned again and again.

There is accordingly a need in the art to substantially reduce or overcome the inherent limitations of hitherto implementations of the train algorithm that utilize remembered sets and card markings data structures for old generation GC applications.

SUMMARY OF THE INVENTION

It should be noted that in the context of the invention, any reference to a measure indicative of time, encompasses an explicit representation of one or another representation thereof, e.g. coded, and/or encrypted and/or other.

According to one embodiment of the invention, a card table is maintained with an entry for each card, wherein a card time stamp is kept, indicating the last time (preferably garbage collection cycle) the card was modified. Likewise, a car time stamp is maintained for each car, indicating the last time its remembered set was updated. Initially, this is the creation time of the car, but it may later be updated during a collection of another car in the same train. It is the application's responsibility to update the card table band it is the collector's responsibility to update the time stamp of the remembered set for each car.

During a collection of a car, the collector notes the time-stamp of the car, and then scans all cards that have later i.e. newer or equal modification time-stamps. When collecting the new generation, the collector scans only those cards that have been modified in the last collection cycle.

Accordingly, by this aspect the invention provides for a computer implemented method for garbage collection of memory objects in a memory, the method comprising:

(a) partitioning said heap or portion thereof into at least one old and at least one young area;

(b) associating said at least one old area with cars that form part of said at least one old area, card markings and remembered sets data structure; said card markings including, for each card, a card time stamp indicative of a time said card was updated; each of said cars including, a respective car time stamp indicative of a time the remembered set of said car was updated;

(c) identifying all cards that were updated later than the remembered set of a selected one of said cars and in respect of each card thus identified:
  (i) identifying change in pointers that refer from said card to memory object in said selected car and in response to identified change in pointers; and
  (ii) updating the remembered set of said car with the identified pointers; and (d) updating the car time stamp associated with said selected car;

The invention further provides for a system for garbage collection of memory objects in a memory heap; the system comprising memory heap or portion thereof that is partitioned into at least one old and at least one young areas; said at least one old area is associated at least cars that form part of said at least one old area, card markings and remembered sets data structure; said card markings includes, for each card, a card time stamp indicative of the time said card was updated; said car includes, for each car, a car time entry stamp indicative of the time the remembered set of said car was updated; the system further comprising:

processor communicating with said memory, and being capable of:
  (i) identifying all cards that were updated later than the remembered set of a selected car and in response thereto perform: identifying change in pointers that refer from said card to memory object in said selected car and in response to identified change in pointers; updating the remembered set of said car with the identified pointers; and
  (ii) updating the car time stamp associated with said selected car.

Still further, the invention provides for a storage medium associated with a processor and accessible to garbage collection application running on said processor, for garbage collection of memory objects, the storage medium includes: memory heap or portion thereof that is partitioned into at least one old and at least one young areas; said at least one old area is associate at least cars that form part of said at least one old area, card markings and remembered sets data structure; said card markings includes, for each card, a card time stamp indicative of the time said card was updated; said car includes, for each car, a car time stamp indicative of the time the remembered set of said car was updated.

Still further, there is provided an efficient technique for handling overflow in a card time stamp. The specified technique is disclosed in a co-pending U.S. patent application Ser. No. 09/139,753 assigned to the present Applicant and filed simultaneously to the present application and entitled "A Method for Handling Overflow of Counters in Comparison Based Actions". The contents of U.S. patent application Ser. No. 09/139,753 are incorporated herein by reference.

Accordingly, the invention provides a method of the kind specified, further comprising a counter for setting first and second counter values in respects of first and second objects respectively, said counter having a range of n possible values and being incremented or decremented in accordance with update criterion, an action is taken according to a decision criterion that includes the stipulation that the first counter value is larger or equal to the second counter value;

a method is capable of handling a counter overflow event whereby the counter is incremented beyond said range, the method further includes the steps of:
  A) compacting the first and second counter values to m values (m<n) so as to constitute first and second compacted counter values respectively; such that if the first counter value is larger than or equal to the second counter value then the compacted first value is not smaller than the compacted second value; and
  B) setting the counter to a value from among n−m values within said range, whereby substantially n−m counter values are released.

Still further, the invention provides a system of the kind specified, further comprising a counter for setting first and second counter values in respect of first and second objects, respectively, said counter having a range of n possible values and being incremented or decremented in accordance with update criterion;

an action is taken according to a decision criterion that includes the stipulation that the first counter value is larger or equal to the second counter value;

the processor is capable of handling a counter overflow event whereby the counter is incremented beyond said range; said processor includes:
  (i) compactor, compacting the first and second counter values to in values (m<n) so as to constitute first and second compacted counter values respectively; such that if the first counter value is larger than or equal to the second counter value then the compacted first value is not smaller than the compacted second value; and
  (ii) counter setting unit, setting the counter to a value to a value from among n−m values within said range, whereby substantially n−m counter values are released.

BRIEF DESCRIPTION OF THE DRAWINGS

For a better understanding, the invention will now be described, by way of non-limiting example only, with reference to the accompanying drawings, in which:

FIGS. 3A–C illustrate schematically a heap memory structure and associated structures for use with old generation garbage collection procedure, according to one embodiment of the invention;

DETAILED DESCRIPTION OF SPECIFIC EMBODIMENTS

Before turning to a description of specific embodiments the following observations should be borne in mind.

Observation 1: When a new car is created (during a collection) and objects are moved into the car, its remembered set can be exactly computed by the collector. It is always the case that when an object is moved, all references to the object are known, since these references must be updated. This is true no matter if the objects arrive through promotion or through relocation of objects in the old generation. Thus, while setting up a new car during a garbage collection cycle and moving objects into the car, the initial remembered set for the car can be computed.

Observation 2: When a card is modified by the application, it should be rescanned once for updating the remembered sets of the following areas only: the young generation and each car that currently exists in the old generation.

Clearly, the modified card needs to be rescanned in order to update the remembered sets of the areas mentioned. If a new car is later created, then a card which was previously modified need not be rescanned when the new car is later collected.

From Observations 1 and 2, it follows that for each car, a time stamp is maintained, indicating when it was created and for each card a time-stamp is maintained indicating when it was last modified. The image-stamp is the number of the garbage collection cycle. The cycle number is incremented in the beginning of each collection. The third point below indicates that creation time of the car is not sufficient information. It is also required to keep the level of update for each remembered set. Here is a third point relevant to this scheme.

Observation 3: When a car is collected, the train algorithm starts by computing the remembered set of the full train to which this car belongs.

This computation is done in order to check whether the full train can be reclaimed. While all pointers that refer to memory objects in the train are computed, the remembered sets of all cars are updated. After this update, all cars in the train are updated with respect to all previous modifications in the system and this fact is recorded for future collections.

It should be noted that whilst the latter observations are taken into consideration insofar as preferred embodiments of the invention are concerned, the invention is by no means bound by the specified observations.

Figure 1:
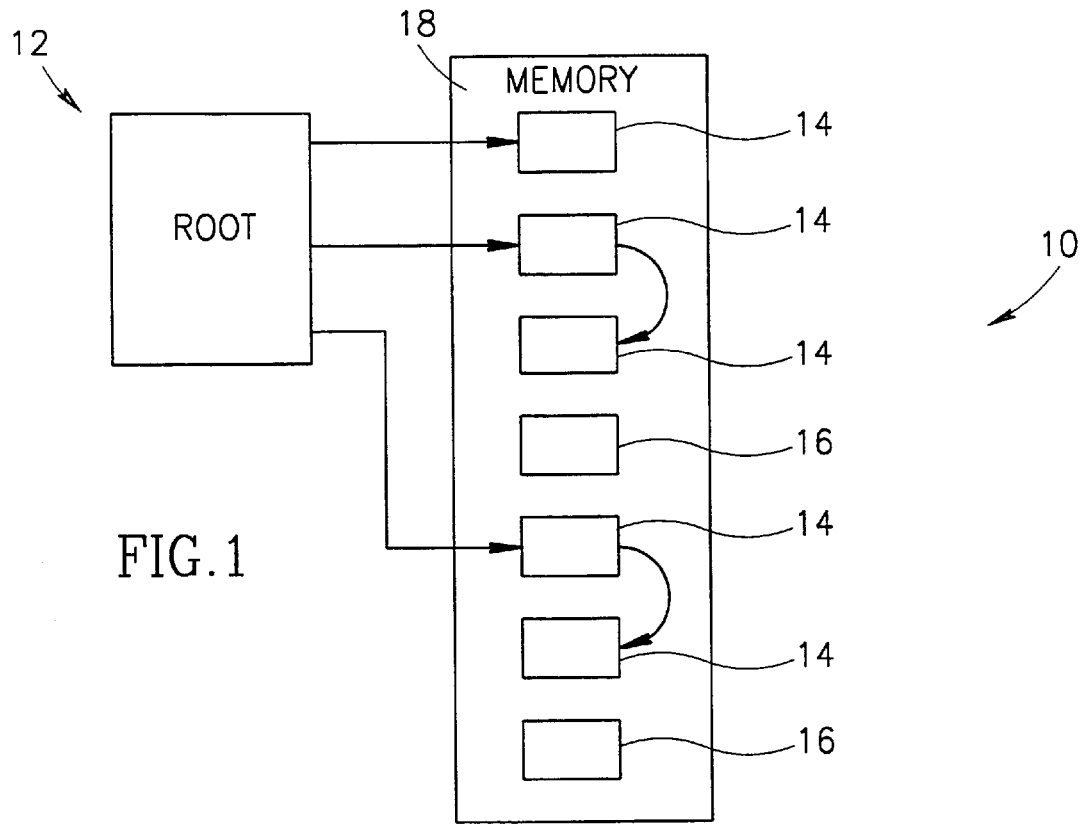
FIG. 1 illustrates, schematically, a heap memory structure for use with a naive garbage collection application.
Figure 2:
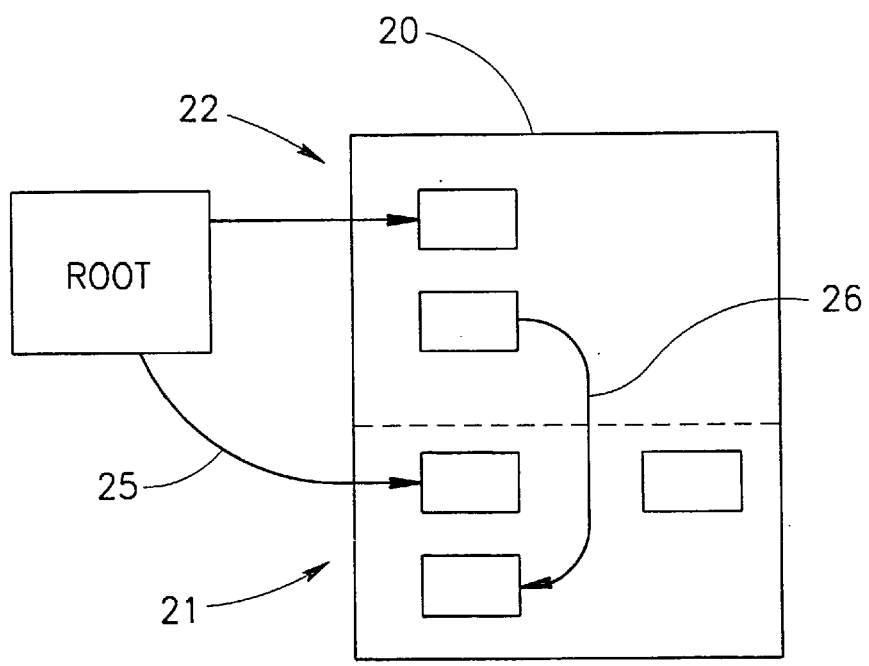
FIG. 2 illustrates schematically a heap memory structure for use with generational garbage collection application according to the prior art.
Figure 3A:
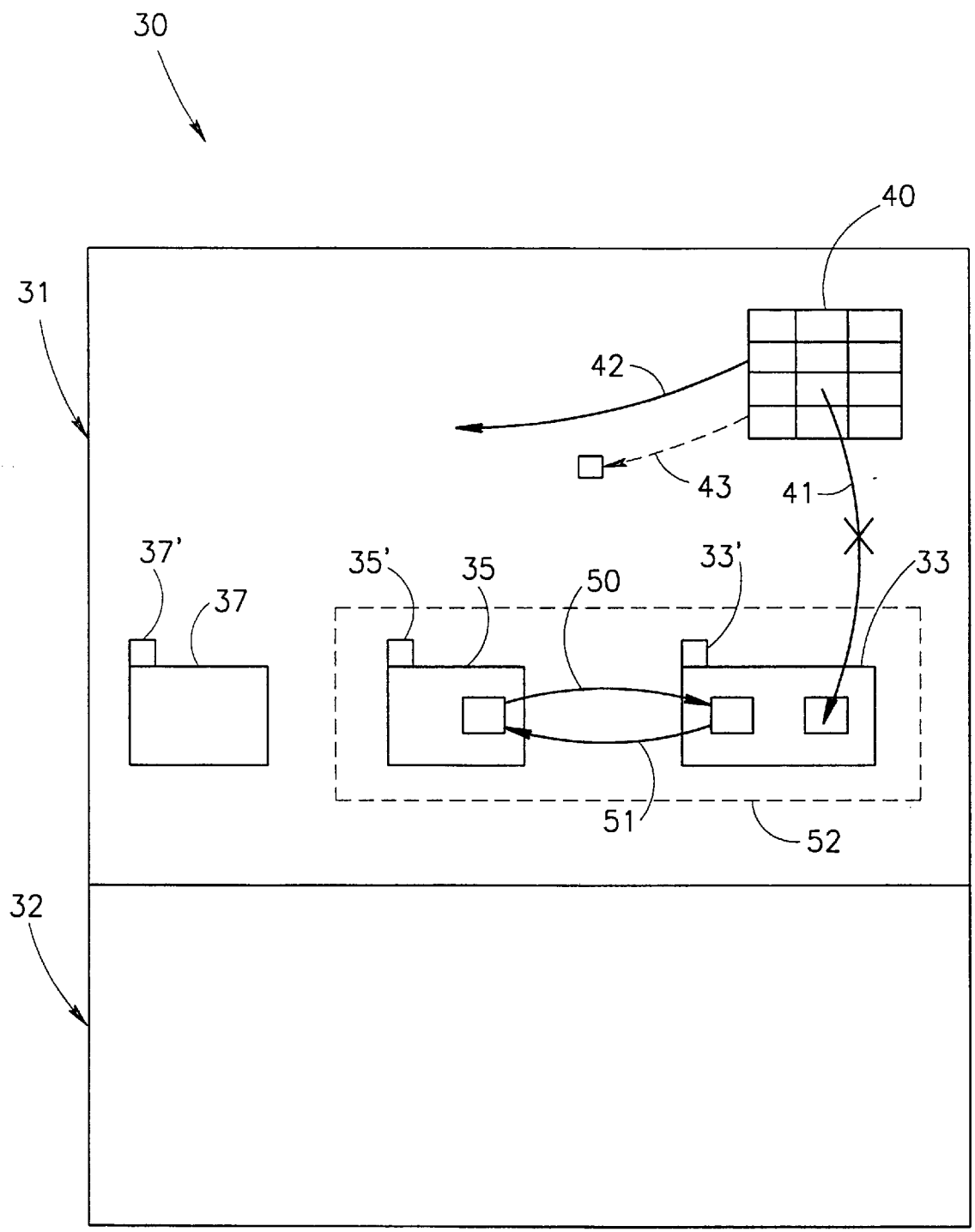

Bearing these specific observations in mind, attention is now directed to FIG. 3A showing schematically a heap memory and associated structure for use with an old generation garbage collection procedure, according to one embodiment of the invention. Thus, the heap memory (30) is divided to old and young areas (31) and (32), respectively. Whilst not shown in FIG. 3A, each of the old and young areas may, in turn, be divided into smaller areas, normally according to "age", all as known per se.

The old area or portion thereof, is partitioned into cars (of which there are shown in FIG. 3A only three (33), (35) and (37). According to the train algorithm, the lowest car (33) is preferably first chosen for collection.

Each car is associated with a remembered set (33'), (35') and (37'), respectively. The remembered set of each given car keeps track on pointers that originate from other cars and point to memory objects within the given car. In order to keep overhead low during garbage collection, card markings are used, i.e. the memory heap or a portion thereof is partitioned into cards.

Thus, the old area is partitioned into cards such as (40), in which there are pointers that point to memory objects within cars. In accordance with the specific example of FIG. 3A only two pointers (41) and (42) are shown. FIGS. 3B and 3C illustrate exemplary, yet not exclusive, data structure that is utilized by the garbage collection application of the invention. Thus, as shown in FIG. 3B, each car is identified by a unique car Id #. (43) and has associated therewith a car time stamp value (44). Likewise, each card (FIG. 30) is identified by unique card Id # (45) and is associated with a card time stamp value (46).

Those versed in the art will readily appreciate that the embodiment of FIGS. 3A–C is by no means limiting.

Thus, for example, the invention is not bound by any specific data structure for representing remembered sets and/or card markings and/or car data structure and/or car/card time stamp indications.

Accordingly, if desired, table 3B and 3C may consist each of a ore-byte-long field. Thus, insofar as FIG. 3D is concerned, each entry is associated with respective car, and the contents of the entry signifies the car tine stamp.

Preferably, the time stamp indication specifies for the cycle of garbage collection. In this connection, it should be noted that the time stamp may be represented in any desired manner an not necessarily by indicating explicitly the cycle collection valve. Two out of many possible examples for illustrating that the time stamp is not necessarily held in explicit and accurate form are discussed below in connection with overflow handling technique and an efficient implementation for reducing overhead for the user application.

Reverting now to the example of FIG. 3A, the car with the lowest number is initially scanned and in accordance with the example of FIG. 3A this is car (33). The purpose of the scan is to identify whether there are outside pointers that refer to memory objects within the car. The memory objects will be moved to another car or to a new car (according to the stipulation of the known train algorithm) and the car thus scanned can be collected, thus leaving free memory space for claiming by a new application. As is well known in the train algorithm, when there are bi-directional inter-car pointers between cars (e.g. (50) and (51) in FIG. 3A) in the same train, but no pointers outside the train reference objects inside the train, a train of cars is collected in the same cycle of garbage collection. According to the specific example of FIG. 3A train (52) is to be collected.

Basically, whenever a card is changed by the user/system application, (e.g. the pointer (41) is deleted) the card stamp value thereof is updated. According to one example, the updated value is the current garbage collection cycle (which may be stored, for example, in a dedicated counter—not shown in the Figs).

The car time stamp value, in turn, is updated (also, preferably, with the current garbage collection cycle) when the remembered set of the specified car is updated.

The operation of the garbage collection application according to an embodiment of the invention will now be described with reference also to FIG. 4.

Figure 4:
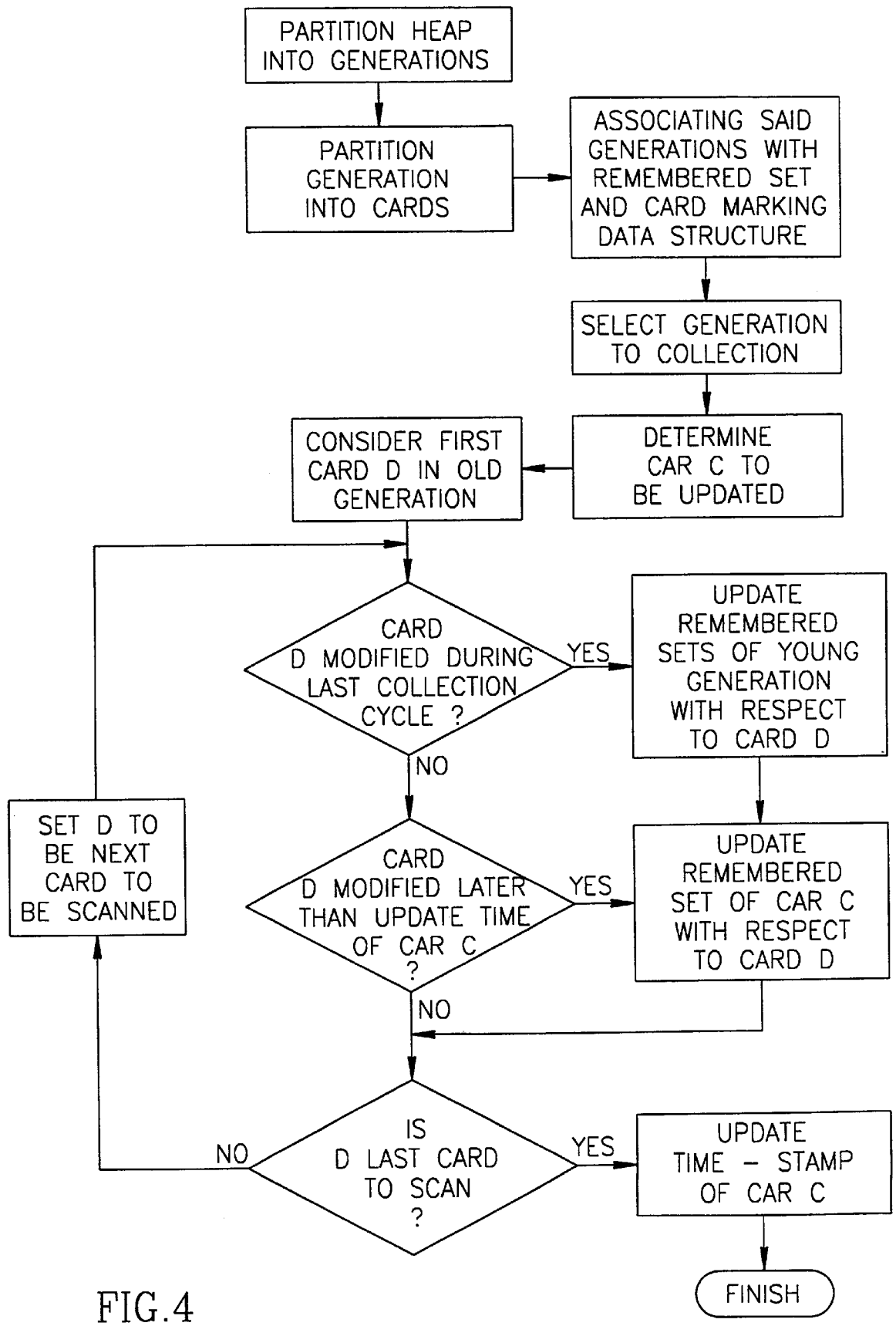
FIG. 4 is a generalized block diagram illustrating operational step of garbage collection application, according to the embodiment of FIGS. 3A–3C.

It should be noted, generally, that the operational steps of FIG. 4 forming part of garbage collection application are executed by a processor. A processor may be any device (e.g. conventional personal computer) or network of devices capable of running applications, all as known per se.

As a matter of default (in one embodiment), the garbage calculation cycle is initially updated to '1' and the time stamp of all the cars is initially set to 1 (indicating that for garbage collection cycle 1 all the remembered sets are duly updated). The counter that specifies the garbage collection cycle is now set as a preparatory step to 2.

Assuming now that pointer (41) has been deleted, this entails updating the time stamp of card (40) to 2.

The criterion for deciding which cards are to be scanned (in respect of the currently scanned car (33)), is whether the card has been modified after the remembered set of the car has been updated. In other words if the card has been modified after the updating of the remembered set (of the specified car) and the modification affects the pointers that refer to the scanned car, it is required to update the remembered set. If, on the other hand, the card were modified before the update of the remembered set, the need to scan the card is obviated.

Reverting now to the specific example of FIG. 3A, for those cards that have been changed after the update of the remembered set, the garbage collector checks whether there is a change in pointers originating from the specified card and referring to the car thus scanned. If in the affirmative, the remembered set is duly updated (i.e. pointers are inserted and/or deleted). Thereafter, when all the cards have been scanned in the manner specified, it is possible to update the car time stamp to '2' signifying that the remembered set is in updated state for the second cycle of garbage collection.

Next, a garbage collection procedure which may be known per se is applied according to the train algorithm, where on the basis of the remembered set, the "alive" objects in the car are identified (i.e. memory objects having outside pointers referring to them) and are subsequently moved to new or existing car whereupon the car thus scanned can be collected. The train algorithm supports the mode of operation where if a train of cars is encountered (e.g. (33) and (35)), the living objects are gradually moved therefrom (to new or existing car(s)) and they are eventually collected, again all as known per se.

Having described the normal course of garbage collection operation according to one embodiment of the invention, those versed in the art will appreciate that the invention provides an improvement in that only those cards are scanned as are necessary, thereby minimizing the overhead imposed by garbage collection.

Insofar as the user/system application is concerned, what remains to be done is simply to update the card time stamp (with the garbage collection cycle value) whenever a card is modified (not shown in the drawings).

In accordance with one embodiment, there is provided a technique for reducing the user/system application overhead imposed by updating the card time stamp with the garbage cycle value. According to the latter improvement, the actual cycle number is kept in a counter by the collector, and when a card is modified, the time stamp value thereof is set by the program thread to '0' instead of the garbage collection cycle number. Setting to zero is a fast operation in terms of processor cycles as compared to setting the time stamp value to the actual garbage collection cycle. Naturally, in this embodiment, '0' is an invalid cycle and the garbage collection cycles extend over the range of 1–255 (for 8 bit representation). By following this approach, the overhead imposed on the user or system application is reduced.

When the garbage collector is invoked, it thus refers to all the cards having '0' value. The value is then fixed to the correct time stamp as stored in the counter. Recall that at collection time, the collector must scan all entries in the card table, and determine which of the cards must be scanned. During this scanning, the collector changes all zeros to the current tire stamp. Note that for the collector, this is a negligible increase in processing time, since it has to scan the card-table in any case.

Next, and as explained above, if the card time stamp is "later" than that of the remembered set of the scanned car, the remembered set of the latter is updated.

One important issue still requires consideration, namely, how to set the time stamp of a card when memory objects are copied into the card. Note that during car collection, objects are moved from the collected car to other cars. This has the additional implication of moving objects from one card to another. It is not required to update the card time-stamp of the original card since it is going to be reclaimed with the car to which it belongs. However, since the memory object(s) that are copied to the card (hereinafter "the target card") may include pointers that refer to memory outside the specified target card, the card time stamp of the latter must be updated. In other words, the card-table entry of the new card (to which the object is copied) contains the latest modification time of objects in the new card. That is to say, its time stamp is larger than the modification times of all objects in the target card. This property is maintained in the target card so far (before the update), and the property should be kept also with respect to the new object copied to the card.

Namely, it the modification time of the new object is higher than the maximum in the card, then this modification time should be set to the card entry (field (46) in FIG. 3C). If the new object modification time is lower than the maximum (as indicated in the card-table entry), then no change in the card-table is needed. It remains to explain how to obtain the modification time of the object that is copied. Whilst the modification time data of the specified object are not available, the time stamp of the card (the one from which the object is copied) is known. The latter time stamp of the card is an upper bound on the modification time of the copied object and can be used as a (conservative) estimate on the last time this object was modified, To sum up, when an object is copied from Card $C_1$ to Card $C_2$, the time-stamp of Card $C_2$ is set to the maximum of the time stamps of $C_1$ and $C_2$.

Having described a garbage collection application in an old area of the heap, there now follows a brief description of a garbage collection application in memory heap that includes an old generation (being associated with cars in the manner specified) and in at least two young generations utilizing, basically, the same scheme.

It should first be emphasized that the invention is applicable for any partition that includes at least one old generation, and preferably, additional at least one young generation.

Figure 5:
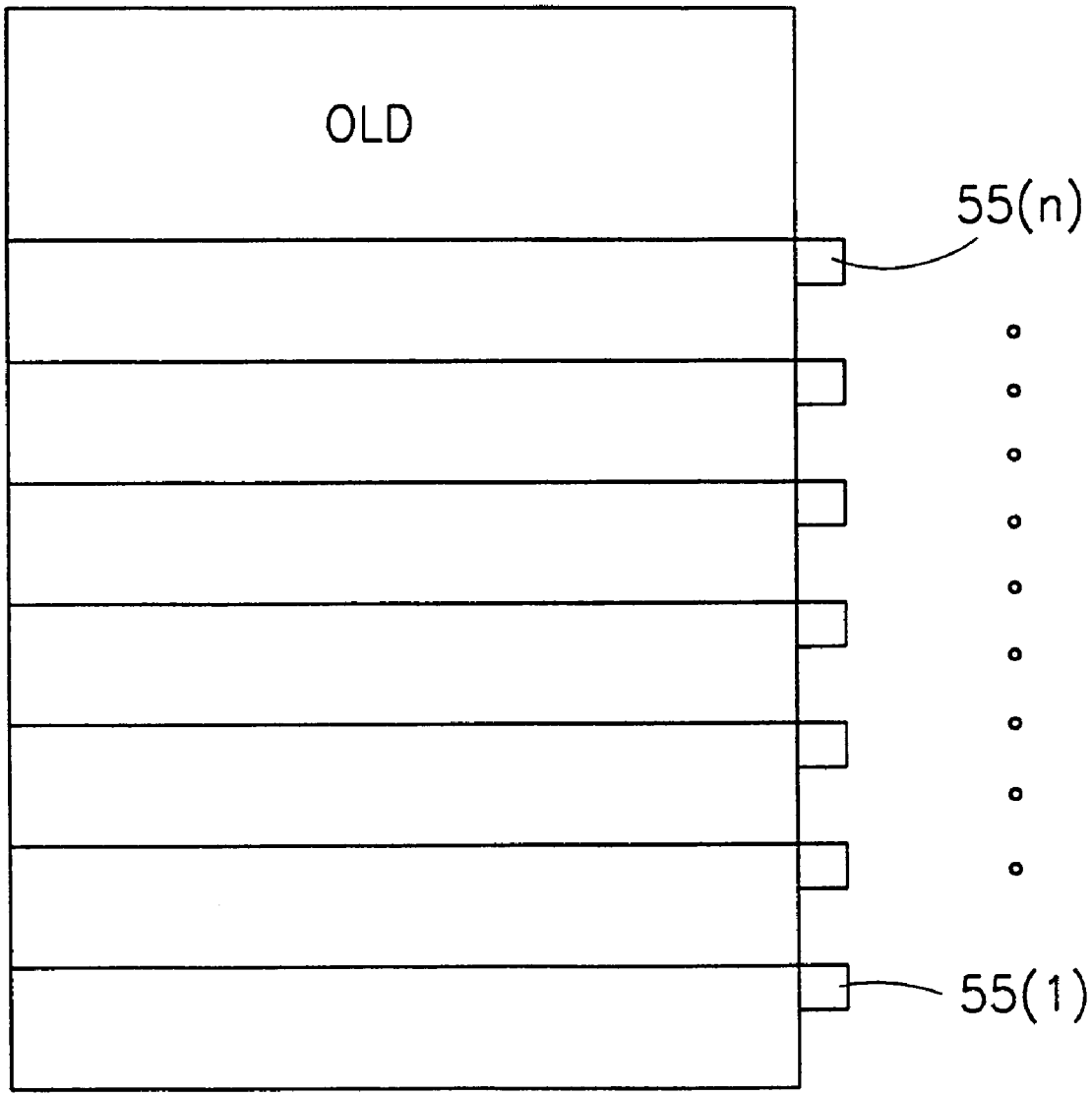
FIG. 5 illustrates schematically a heap memory structure partitioned into an old generation and multi-young generations, being subject to garbage collection application according to one embodiment of the invention.

Thus, as shown in FIG. 5, each generation is associated with a time stamp ($55^{(1)}$–$55^{(n)}$) indicating when the remembered set of this generation was last updated. The collector should update this time stamp whenever it scans the corresponding generations. When scanning a generation g with time stamp t, it is easy to decide if a card needs to be scanned. Thus, if the time stamp of the card is greater than or equal to t, then it means that the card was modified after the last collection of generation g, and therefore this card has to be scanned. All cards with time stamps lower than t need not be scanned. Of course, other techniques may be realized when at least one old and multiple young generations are subject to garbage collection. Thus, by way of non-limiting example, the old generation may be subjected to garbage collection according to the procedure described, e.g. with reference to FIG. 4. In contrast thereto, the young generations may be subjected to garbage collection according to the technique disclosed in a co-pending U.S. Patent Application Serial No. filed simultaneously with the present application, whose contents are incorporated herein by reference.

Those versed in the art will readily appreciate that modifying the card scan indication is a relatively short operation for the program thread and, therefore, the computational overhead imposed by updating the card scan indication is very low.

Any card that is modified by the user application, (i.e. there is change in pointer originating from the specified card) necessitates updating of the card scan indication to a value (e.g. 0) which signifies that the modified card should be scanned for all generations. As explained before, the specified update imposes a very low computational overhead.

The garbage collection may now be realized in a known per se manner by checking the remembered set.

In the following claims, numbers, alphabetic characters and roman characters are presented for convenience of explanation only and should by no means be regarded as binding.

The invention has been described with a certain degree of particularity, but those versed in the art will readily appreciate that various modifications and alterations may be carried out without departing from the scope and spirit of the following claims:

What is claimed is:

1. A computer implemented method for garbage collection of memory objects in a memory, the method comprising:
    (a) partitioning said heap or portion thereof into at least one old and at least one young area;
    (b) associating said at least one old area with cars that form part of said at least one old area, card markings and remembered sets data structure; said card markings including, for each card, a card time stamp indicative of a time said card was updated; each of said cars including, a respective car time stamp indicative of a time the remembered set of said car was updated;
    (c) identifying all cards that were updated later than the remembered set of a selected one of said cars and in respect of each card thus identified:
        (i) identifying change in pointers that refer from said card to memory object in said selected car and in response to identified change in pointers; and
        (ii) updating the remembered set of said car with the identified pointers; and
    (d) updating the car time stamp associated with said selected car.

2. The method in claim 1, further comprising
    (e) in the case that a card is modified, updating the card time stamp in said card markings; and
    (f) applying garbage collection to memory objects according to said remembered set.

3. The method of claim 1, wherein the step of updating said car time stamp includes updating said car time stamp with garbage collection cycle value, and wherein the step of updating said card time stamp includes updating said card time stamp with garbage collection cycle value.

4. The method according to claim 2, wherein said garbage collection cycle number does not include 0 as a valid value and wherein said step of updating the card time stamp in said card markings, includes:
    (i) updating said time stamp to 0 value;
    (ii) said step of identifying all cards that were updated later than the remembered set of a selected car includes:
        (i) identifying cards having time stamp value equal to 0, and in response thereto updating the card time stamp from 0 to a current garbage collection cycle valves, and
        (ii) identifying all cards having updated card time stamp later than the car time stamp of said selected car.

5. The method according to claim 2, wherein said step (f) further including, applying said garbage collection according to said train algorithm.

6. The method according to claim 2, wherein said step (e) further comprising: in the case that at least one memory object is copied from first card into a second card, updating the card time-stamp of the seconds card to the maximum over the card time stamps of said first and second cards.

7. The method according to claim 2, further comprising the step of applying garbage collection of memory objects also to said young area.

8. The method of claim 7, wherein said young area is partitioned into plurality of generations and wherein said step of applying garbage collection to said young area includes:
    (a) associating each young generation with a generation time stamp indicating when the remembered set of said respective generation was last updated;
    (b) updating said generation time stamp whenever a selected generation is scanned; and
    (c) scanning cards having card time stamp later than the generation time stamp of said selected generation.

9. A system for garbage collection of memory objects in a memory heap; the system comprising memory heap or portion thereof that is partitioned into at least one old and at least one young areas; said at least one old area is associated at least cars that form part of said at least one old area, card markings and remembered sets data structure; said card markings includes, for each card, a card time stamp indicative of the time said card was updated; said car includes, for each car, a car time entry stamp indicative of the time the remembered set of said car was updated; the system further comprising:
    processor communicating with said memory, and being capable of:
        (i) identifying all cards that were updated later than the remembered set of a selected car and in response thereto perform: identifying change in pointers that refer from said card to memory object in said selected car and in response to identified change in pointers, updating the remembered set of said car with the identified pointers; and (ii) updating the car time stamp associated with said selected car.

10. The system of claim 9, wherein said processor is further capable of:
(i) in the case that a card is modified, updating the card time stamp in said card markings; and
(ii) applying garbage collection to memory objects according to said remembered set.

11. The system of claim 9, wherein said time stamp is updated by said processor with garbage collection cycle value, and wherein the said card time stamp is updated by said processor with garbage collection cycle value.

12. The system of claim 10, wherein said garbage collection cycle does not include 0 as a valid value and wherein said processor updates the card time stamp in said card marking by updating said time stamp to 0 value;
said processor is further capable of identifying all cards that were updated later than the remembered set of a selected car by identifying cards having time stamp value equal to 0, and in response thereto updating the card time stamp from 0 to a current garbage collection cycle, and identifying all cards having updated card time stamp later than the car time stamp of said selected car.

13. The system of claim 9, wherein said processor is capable of applying said garbage collection according to a train algorithm.

14. The system according to claim 9, wherein said processor is further capable:
in the case that at least one memory object is copied from first card into a second card, updating the card timestamp of the second card to the maximum over the card time stamps of said first and second cards.

15. The system according to claim 9, wherein said processor is further capable of applying garbage collection of memory objects also to said young area.

16. The system according to claim 15, wherein said young area is partitioned into plurality of generations and wherein said processor is capable of applying garbage collection to said young area by:
(a) associating each young generation with a generation time stamp indicating when the remembered set of said respective generation was last updated;
(b) updating said generation time stamp whenever a selected generation is scanned; and
(c) scanning cards having card time stamp later than the generation time stamp of said selected generation.

17. A storage medium associated with a processor and accessible to garbage collection application running on said processor, for garbage collection of memory objects, the storage medium includes:
memory heap or portion thereof that is partitioned into at least one old and at least one young areas; said at least one old area is associated at least cars that form part of said at least one old area, card markings and remembered sets data structure; said card markings includes, for each card, a card time stamp indicative of the time said card was updated; said car includes, for each car, a car time stamp indicative of the time the remembered set of said car was updated.

18. The computer implemented method of claim 1 further comprising a counter for setting first and second counter values in respect of first and second objects respectively, said counter having a range of n possible values and being incremented or decremented in accordance with update criterion,
an action is taken according to a decision criterion that includes the stipulation that the first counter value is larger or equal to the second counter value;
a method is capable of handling a counter overflow event whereby the counter is incremented beyond said range, the method further includes the steps of:
A) compacting the first and second counter values to m values (m<n) so as to constitute first and second compacted counter values respectively; such that if the first counter value is larger than or equal to the second counter value then the compacted first value is not smaller than the compacted second value; and
B) setting the counter to a value from among n–m values within said range,
whereby substantially n–m counter values are released.

19. The system of claim 9, further comprising a counter for setting first and second counter values in respect of first and second objects, respectively, said counter having a range of n possible values and being incremented or decremented in accordance with update criterion,
an action is taken according to a decision criterion that includes the stipulation that the first counter value is larger or equal to the second counter value;
the processor is capable of handling a counter overflow event whereby the counter is incremented beyond said range; said processor includes:
(i) compactor, compacting the first and second counter values to m values (m<n) so as to constitute first and second compacted counter values respectively; such that if the first counter value is larger than or equal to the second counter value then the compacted first value is not smaller than the compacted second value; and
(ii) counter setting unit, setting the counter to a value to a value from among n–m values within said range, whereby substantially n–m counter values are released.

* * * * *